United States Patent
Li et al.

(10) Patent No.: US 10,395,056 B2
(45) Date of Patent: Aug. 27, 2019

(54) PROTECTING PRIVACY OF DIGITAL IMAGES

(71) Applicant: International Business Machines Corporation, Armonk, NY (US)

(72) Inventors: Jia Tao Li, Beijing (CN); Jun Hui Ma, Beijing (CN); Hong Fu Wei, Beijing (CN); Zhen Ling Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/583,353

(22) Filed: May 1, 2017

(65) Prior Publication Data

US 2018/0314850 A1 Nov. 1, 2018

(51) Int. Cl.
*G06T 5/00* (2006.01)
*G06K 9/00* (2006.01)
*G06F 21/62* (2013.01)

(52) U.S. Cl.
CPC ...... *G06F 21/6245* (2013.01); *G06F 21/6254* (2013.01); *G06K 9/00248* (2013.01); *G06K 9/00677* (2013.01); *G06T 5/002* (2013.01)

(58) Field of Classification Search
CPC ............ G06F 21/6218; G06F 21/6245; G06K 9/00228; G06K 9/00288; G06T 5/002
See application file for complete search history.

(56) References Cited

U.S. PATENT DOCUMENTS

| | | | |
|---|---|---|---|
| 8,345,934 B2 | 1/2013 | Obrador et al. | |
| 8,646,095 B2 * | 2/2014 | Mattox, Jr. | G06F 21/6245 709/217 |
| 8,744,143 B2 | 6/2014 | Chen | |
| 9,298,931 B2 * | 3/2016 | Ur | G06F 21/60 |
| 9,311,678 B2 * | 4/2016 | He | G06Q 50/01 |
| 9,542,564 B2 * | 1/2017 | Mattox, Jr. | G06F 21/6245 |
| 9,646,173 B2 * | 5/2017 | He | G06Q 50/01 |
| 10,235,536 B2 * | 3/2019 | VanBlon | G06F 21/6254 |

(Continued)

FOREIGN PATENT DOCUMENTS

| | | |
|---|---|---|
| EP | 2902941 A1 | 8/2015 |
| WO | 2012135156 A2 | 10/2012 |

OTHER PUBLICATIONS

Price, E., "Facebook Photos Get Blurry With This Privacy Plug-In", Mashable, http://mashable.com/2012/08/02/facebook-social-protection-mcafee/#hJRz2g7RrZq4, Aug. 2, 2012, Accessed on Apr. 25, 2017, 7 pages.

(Continued)

*Primary Examiner* — Linglan E Edwards
(74) *Attorney, Agent, or Firm* — Scully, Scott, Murphy & Presser, P.C.; David Zwick, Esq.

(57) ABSTRACT

A method, system, and computer product for protecting personal privacy of one or more persons in a photo are provided. The method comprises receiving a photo including a face of at least one person, performing face recognition on the at least one person in the photo, determining a cross-relationship value between another person and the at least one person, based on a degree of closeness between said another person and the at least one person, and determining whether to show said another person the face of the at least one person in the photo, based on the cross-relationship value.

17 Claims, 8 Drawing Sheets

(56) References Cited

U.S. PATENT DOCUMENTS

| | | | |
|---|---|---|---|
| 2012/0159635 A1* | 6/2012 | He | G06Q 50/01 |
| | | | 726/26 |
| 2012/0188277 A1 | 7/2012 | Hebbar et al. | |
| 2012/0213420 A1* | 8/2012 | Steiner | G06K 9/00295 |
| | | | 382/118 |
| 2012/0250951 A1* | 10/2012 | Chen | G06F 21/6245 |
| | | | 382/118 |
| 2013/0254843 A1 | 9/2013 | Dagaeff et al. | |
| 2013/0304727 A1* | 11/2013 | Poon | G06F 17/30477 |
| | | | 707/722 |
| 2014/0086493 A1 | 3/2014 | Kothari | |
| 2014/0196152 A1 | 7/2014 | Ur et al. | |
| 2016/0132719 A1* | 5/2016 | Fithian | G06F 16/5866 |
| | | | 345/647 |

OTHER PUBLICATIONS

Ilia, P., et at, "Face/Off: Preventing Privacy Leakage From Photos in Social Networks", CCS'15, Oct. 12-16, 2015, 12 pages.

* cited by examiner

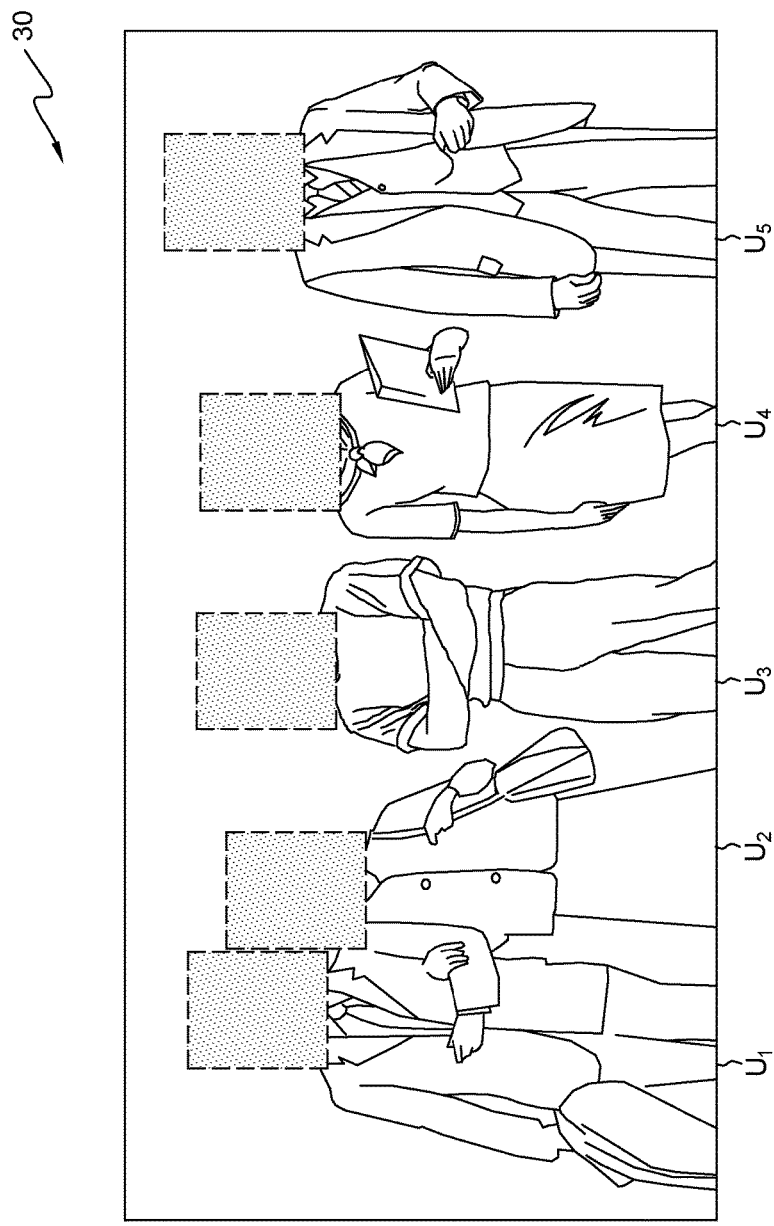

PROTECTING PRIVACY OF DIGITAL IMAGES

FIELD

The present disclosure relates to a privacy protection technique for uploaded digital images, and more particularly, to a method, system, and computer product for showing faces in a photo only to friends, family, colleagues, etc.

BACKGROUND

While the uploading of photos to social media networks to share them with their family or friends has dramatically increased, there is also much concern about personal privacy which may be leaked through the uploaded photos.

In efforts to protect the personal privacy, some social media networks allow users to add group/tag or assign permission as to who can access uploaded photos. Also, users can blur a part of human faces in photos before uploading to avoid a risk that strangers see his/her own family or friends. However, most of the solutions are focused on pre-image processing before uploading images or blocking unauthorized users from downloading or capturing the images, but do not address post-image processing issues after uploading or downloading the images.

SUMMARY

In an aspect of the present disclosure, a computer-implemented method for protecting personal privacy of one or more persons in a photo is provided. The method comprises receiving a photo including a face of at least one person, performing face recognition on the at least one person in the photo, determining a cross-relationship value between another person and the at least one person, based on a degree of closeness between said another person and the at least one person, and determining whether to show said another person the face of the at least one person in the photo, based on the cross-relationship value.

In an aspect of the present disclosure, a system for protecting personal privacy of one or more persons in a photo is provided. The system includes a memory device and a processing device coupled to the memory device. The processing device is configured to perform receiving a photo including a face of at least one person, performing face recognition on the at least one person in the photo, determining a cross-relationship value between another person and the at least one person, based on a degree of closeness between said another person and the at least one person, and determining whether to show said another person the face of the at least one person in the photo, based on the cross-relationship value.

In an aspect of the present disclosure, a computer program product comprising a computer readable storage medium having computer readable program instructions embodied therewith is provided. The computer readable program instructions executable by at least one processor to cause a computer to perform a computer-implemented method for protecting personal privacy of one or more persons in a photo. The method comprises receiving a photo including a face of at least one person, performing face recognition on the at least one person in the photo, determining a cross-relationship value between another person and the at least one person, based on a degree of closeness between said another person and the at least one person, and determining whether to show said another person the face of the at least one person in the photo, based on the cross-relationship value.

BRIEF DESCRIPTION OF THE DRAWINGS

FIG. 4B is an example photo after the users' faces are blurred and before the blurring of faces are removed, according to an exemplary embodiment of the present disclosure;

DETAILED DESCRIPTION

Embodiments of the present disclosure will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

According to exemplary embodiments of the present disclosure, a method, system, and computer product for protecting personal privacies in a photo. In the context of the present disclosure, the terms "user" and "person" can be interchangeable. For example, for "users in a photo", the term "users" are not necessarily individuals who have signed up a particular social media network service, but could be any persons in that photo.

Figure 1A:
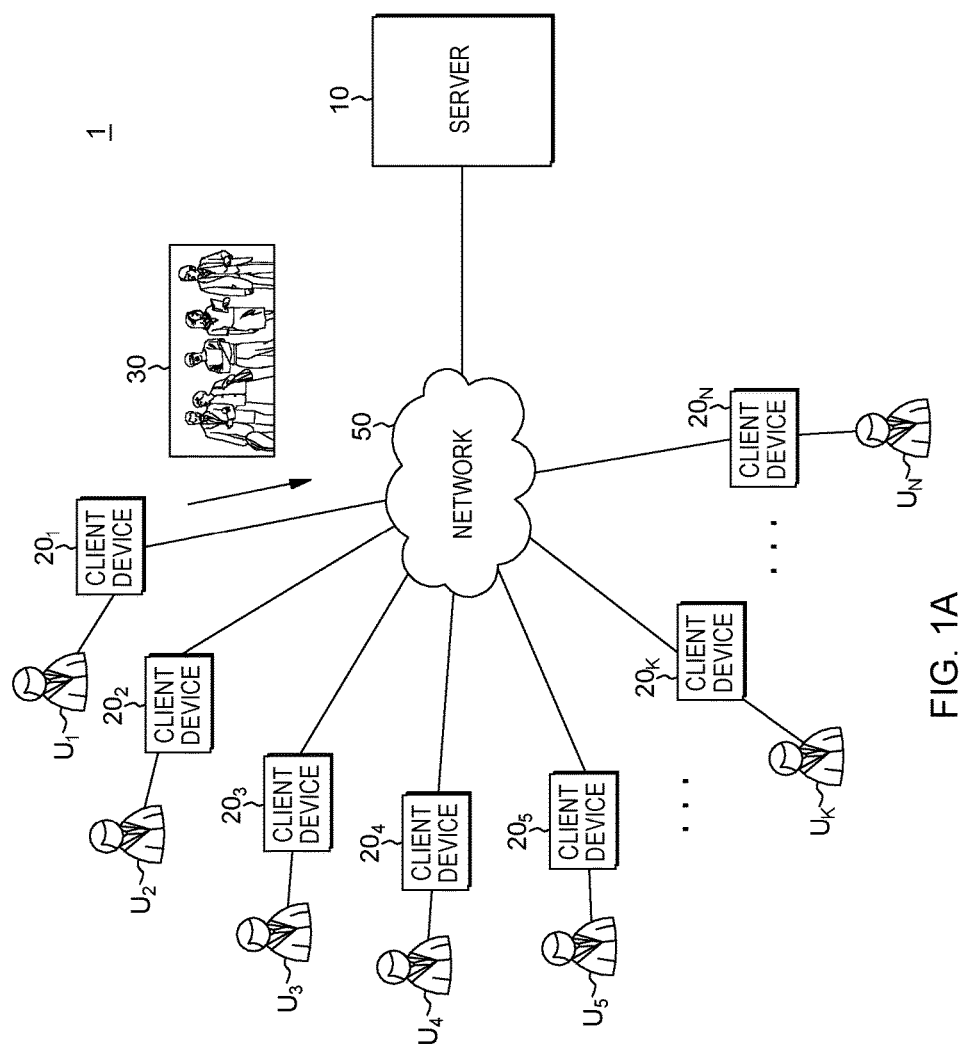
FIG. 1A depicts an example network environment which users employ to share photos according to an exemplary embodiment of the present disclosure.

FIG. 1A depicts an example network environment 1 which users employ to share photos according to an exemplary embodiment of the present disclosure.

Referring now to FIG. 1A, the network environment 1 may include a server 10, a plurality of client devices $20_1$ to $20_N$, and a communication network 50. Also, there are a plurality of users $U_1$ to $U_N$, each of which owns or drives a corresponding one of the client devices $20_1$ to $20_N$. Here, each of N is an integer equal to or greater than one. The network 50 may be configured to support communications among the server 10, the client devices $20_1$ to $20_N$ and may be implemented based on wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long-term evolution (LTE), wireless LAN, Bluetooth, or the like.

The server 10 may refer to a network system or platform configured to provide various services such as uploading/sharing/storing of various information or data such as digital images (e.g., photos) transmitted from the client devices (e.g., $20_1$ to $20_{N-1}$ of FIG. 1A) owned or operated, respectively, by users $U_1$ to $U_N$. To this end, the server 10 may include a framework of hardware, software, firmware, or any combination thereof (not shown), to which, e.g., uploaded images can be stored or from which the images can be shared with other users. In some embodiments, the server 10 may be a social networking service, or a social network site, etc.

Each client device $20_1$ to $20_N$ may refer to any device with the capability to acquire, capture, receive, manipulate, display, and/or upload various information or data such as digital images, etc. Examples of such devices include, but are not limited: an ultra-mobile PC (UMPC), a net-book, a personal digital assistant (PDA), a portable computer, a web tablet, a wireless phone, a mobile phone, a smart phone, an e-book, a portal media player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like, all of which may be connected to the aforementioned network 50.

Figure 4A:
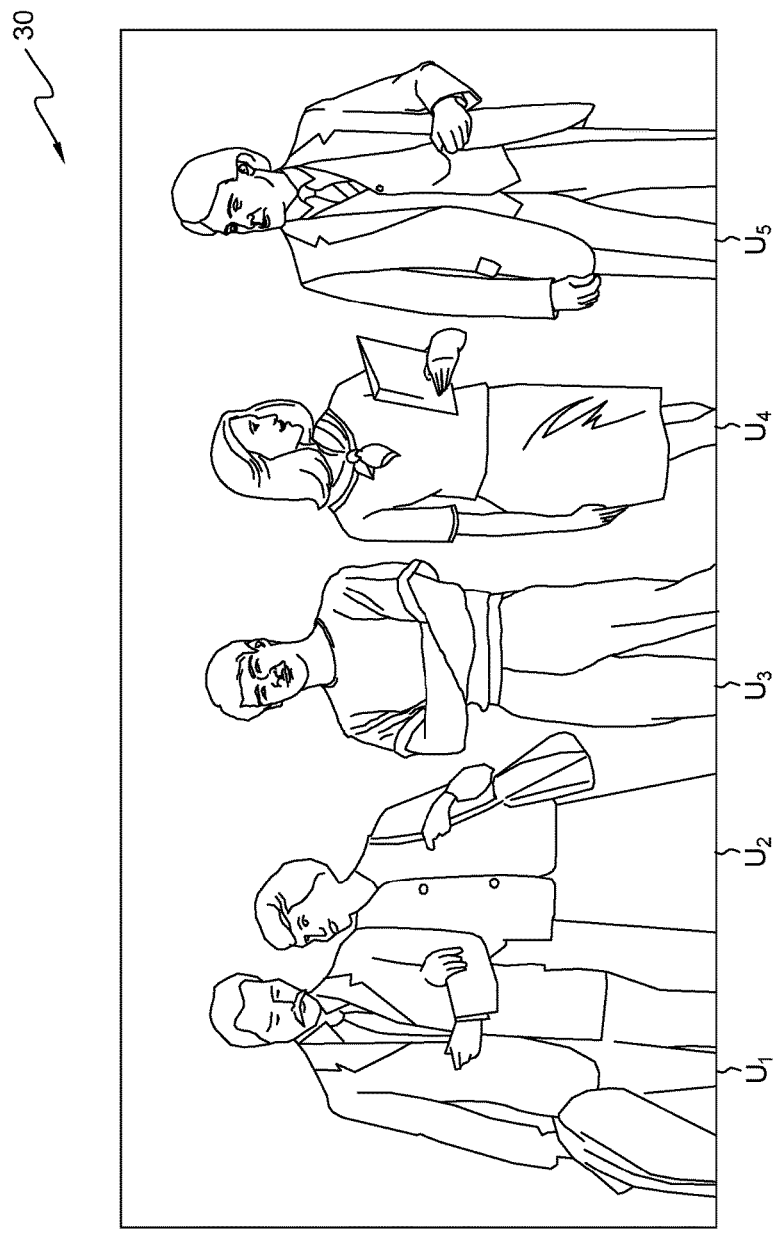
FIG. 4A is an example original photo before users' face are blurred, according to an exemplary embodiment of the present disclosure.

For ease of illustration, it is assumed as an example that there is a group photo (e.g., 30 of FIG. 1A) which contains faces (or face images) of the users $U_1$ to $U_5$; the user $U_1$ uploads the photo 30 to the server 10; and other user $U_K$ requests for accessing the photo 30 which has been available in the server 10 or a social media site operated by the server 10 in order to download the photo 30 and/or see faces of the users $U_1$ to $U_5$ in the photo 30. Here, "K" is an integer such that $1 \leq K \leq N$. In the context of the present disclosure, "access (ing) a photo" refers to "download(ing), see(ing), or view (ing) the photo. It is also assumed that the user $U_K$ is not among the persons (e.g., the users ($U_1$ to $U_5$) taken in the photo 30, however, in other examples, the user $U_K$ can be among the persons in the photo 30. However, exemplary embodiments of the present disclosure are not limited to the above-mentioned examples; for example, the photo 30 includes a single user's face or faces of other users more than the users $U_1$ to $U_5$. FIG. 4A shows an example photo 30 taken for the users $U_1$ to $U_5$.

Figure 1B:
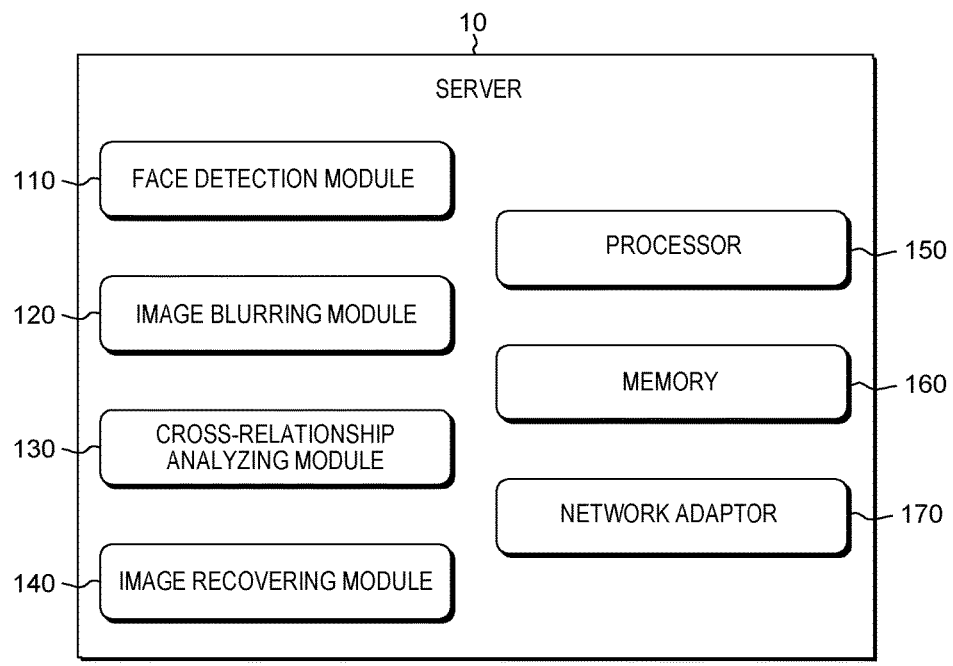
FIG. 1B depicts an example block diagram of a server according to an exemplary embodiment of the present disclosure.

FIG. 1B depicts an example block diagram of a server 10 according to an exemplary embodiment of the present disclosure. As depicted FIG. 1B, the server 10 includes a face detection module 110, an image blurring module 120, a cross-relation analyzing module 130, an image recovering module 140, a processor 150, a memory 160, and a network adaptor 170.

Referring still to the example of FIG. 1B, the face detection module 110 may be a component, element, or device that that is configured, designed, and/or programmed to detect (or recognize) faces (or face regions) of the users $U_1$ to $U_5$ out of the photo 30 and determine identities of the users $U_1$ to $U_5$ in the photo 30.

Functions of the face detection module 110 may be implemented using face detection techniques well known in the art based on, but are not limited to, an Adaptive Boosting (Adaboost) algorithm, a deep learning algorithm, etc. The detailed algorithms and skills for implementation of the face detection module 110 are well known in the art, and are not the main parts of the present disclosure, and thus are not described in detail herein.

The image blurring module 120 may be a component, element, or device that that is configured, designed, and/or programmed to blur the faces of the users $U_1$ to $U_5$ in the photo 30, e.g., by manipulating digital image data representing image pixels in the region to be blurred. In one embodiment, other regions other than the faces may remain without being blurred.

The image recovering module 140 may be a component, element, or device that that is configured, designed, and/or programmed to recover the face images which have been blurred by the image blurring module 120. In one example, if the user $U_K$ (e.g., a user requesting for accessing the photo 30) and a particular user of the photo 30 are in a close relationship (e.g., friends, family, colleagues, etc), the image recovering module 140 may remove blurring of a face of the particular user, so that the user $U_K$ can see the face of the particular user. In other example, if the user $U_K$ and another user of the photo 30 are not in a close relationship, the image recovering module 140 may leave a blurred face of said another user, so that the user $U_K$ will be blocked to see the face of said another user. In one example, the user $U_K$ is a person taken in the photo 30, but in other example, the user $U_K$ is not a person in the photo 30.

In the photo 30, responsive to determining that a degree of closeness between the user $U_K$ (e.g., a user requesting for accessing the photo 30) and the particular user in the photo 30 meets a predetermined criterion. For example, it can be determined that the predetermined criterion is met if a degree of closeness between the user $U_K$ and the particular user in the photo 30 is greater than a predetermined value. A degree of closeness between users may be determined and mapped to a corresponding one of cross-relationship value. The cross-relationship value will be performed by the cross-relationship analyzing module 130 based on, e.g., relationship information among users, details of which will be described in the following paragraphs.

In one example, if the photo 30 contains face images of the users $U_1$ to $U_5$, as shown in FIG. 4A, the image blurring module 120 may blur faces of the users $U_1$ to $U_5$. FIG. 4B shows an example photo 30 in which faces of all the users $U_1$ to $U_5$ are blurred.

Figure 4C:
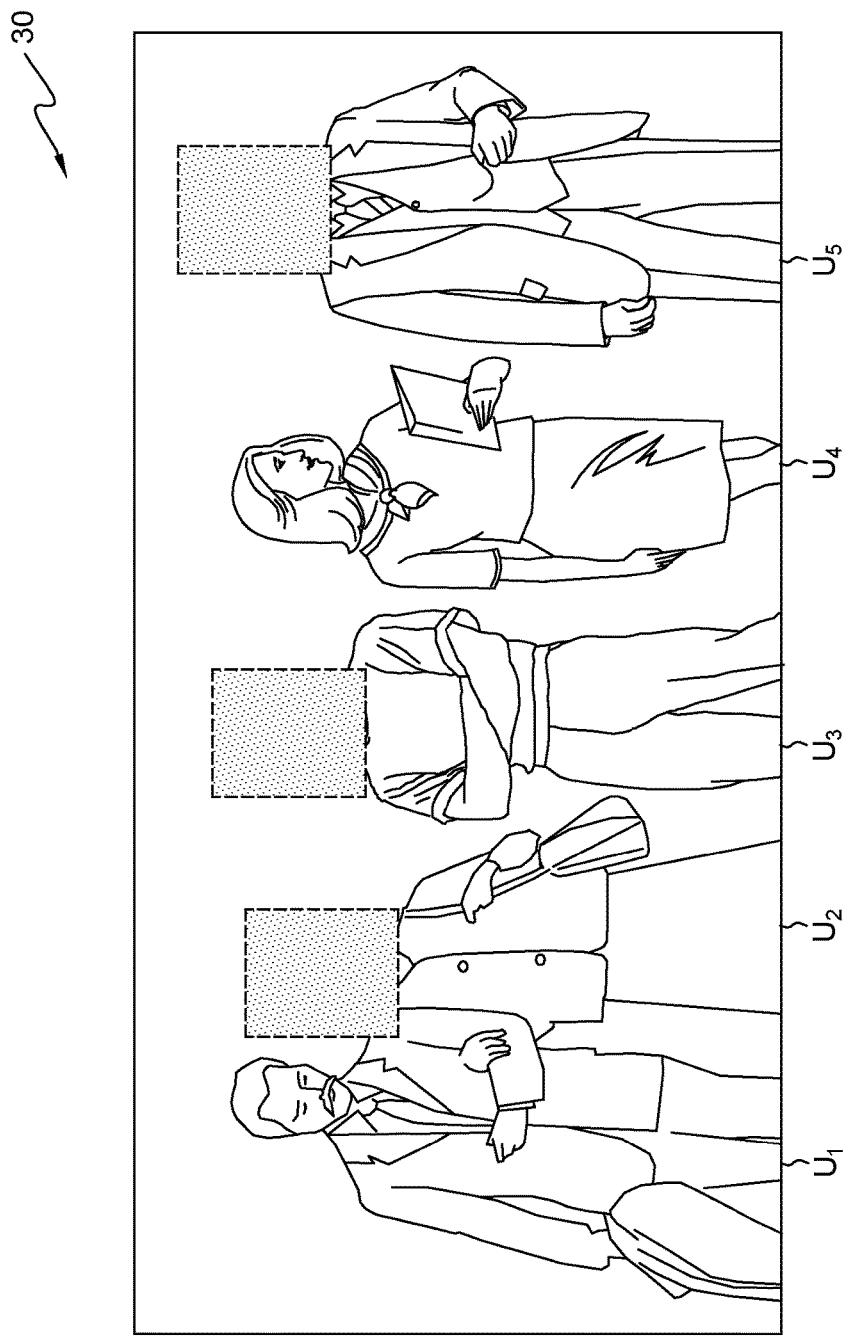
FIG. 4C is an example photo after the blurring of faces are selectively removed, according to an exemplary embodiment of the present disclosure.

Next, if a degree of closeness between the user $U_K$ and each of the users $U_1$ and $U_4$ meets the predetermined criterion, the image recovering module 140 may remove the blurring from faces of the users $U_1$ and $U_4$ (or unblur the faces of the users $U_1$ and $U_4$), so that the user $U_K$ can see the faces of the user $U_1$ and $U_4$ in the photo 30 via the client device $20_{-K}$, as shown in FIG. 4C.

On the other hand, if a degree of closeness between the user $U_K$ and each of the $U_2$, $U_3$, and $U_5$ does not meet the predetermined criterion, the image recovering module 140 may leave the blurring of faces of the users $U_2$, $U_3$, and $U_5$ without removing them, so that the user $U_K$ cannot see the faces of the users $U_2$, $U_3$, and $U_5$ in the photo 30 due to the blurred regions made on the faces thereof, as shown in FIG. 4C.

The cross-relationship analyzing module 130 may be a component, element, or device that that is configured, designed, and/or programmed to analyze or determine cross-relationship values among users (or persons).

In one embodiment, in order to determine cross-relationship values among users, the cross-relationship analyzing module 130 may employ various data and/or information such as users' electronic address books, preset degrees of closeness between users, users' social media contexts (or histories), third-party platform which contains relationship information among users, etc.

In one embodiment, the cross-relationship analyzing module 130 may employ the user $U_K$'s electronic address book to look up relationships between the user $U_K$ and other users $U_1$ to $U_5$ In one example, if the user $U_4$'s name or contact information is found in the user $U_K$'s address book, the cross-relationship analyzing module 130 may determine that a degree of closeness between the users $U_K$ and $U_4$ meets the predetermined criterion and thus determine a cross-relationship value between the users $U_K$ and $U_4$ as "Y". In other example, if the user $U_2$'s name or contact information is not found in the user $U_K$'s address book, the cross-relationship analyzing module 130 may determine that a degree of closeness between the users $U_K$ and $U_2$ does not meet the predetermined criterion and thus determine a cross-relationship value between the users $U_K$ and $U_4$ as "N". The terms "Y" and "N" are used to indicate whether a relationship between users is close enough (e.g., friends, family, colleagues, etc.) to share a photo or allow to see their faces each other in the photo. For example, if a relationship between users is close enough to share a photo or allow to see their faces each other in the photo, the cross-relationship analyzing module 130 may generate a cross-relationship value of "Y" for the relationship between the users; otherwise, the cross-relationship analyzing module 130 may generate a cross-relationship value of "N" for the relationship between the users.

In one embodiment, the address book may be locally stored in each client device (e.g., $20\_K$ of FIG. 1A), or in the memory 160 of the server 10, or other storage devices (not shown).

In one embodiment, a particular user may preset respective degrees of closeness between the particular user and other users and store the degrees of closeness between users in the memory 160 of the server 10 or other storage devices (not shown). Thus, the cross-relationship analyzing module 130 may look into the degrees of closeness between the users to determine whether to assign "Y" or "N" as a cross-relationship value. If a degree of closeness is greater than a predetermined value, the cross-relationship analyzing module 130 may generate a cross-relationship value of "Y". If a degree of closeness is lower than the predetermined value, the cross-relationship analyzing module 130 may generate a cross-relationship value of "N".

In one embodiment, a particular user may send a change request for cross-relationship values between the particular user and other users to the server 10, and the server 10 may update (or change) the corresponding cross-relationship values according to the change request.

For example, if the user $U_4$ has a list of friends who he/she wants to share a photo or allow to see his/her face, the user $U_4$ may preset a first degree of closeness (e.g., direct connectivity) to the above-listed friends and store the preset result in the memory 160 of the server 10 or other storage devices (not shown). In this case, if the user $U_K$ requests for accessing the photo 30 and the user $U_K$ is among the above-listed friends, the cross-relationship analyzing module 130 may identify the first degree of closeness for the relationship between the $U_4$ and $U_K$ based on the stored preset result and determines that the degree of closeness between the users $U_K$ and $U_4$ meets the predetermined criterion, thus generating a cross-relationship value of "Y" for the relationship between the $U_4$ and $U_K$.

In addition, in one embodiment, the cross-relationship analyzing module 130 may look into user's social media histories to determine cross-relationship values between users. The user's social media histories may include, but are not limited: the number of one user's visits to other users' web sites, the number of user's views or comments to other users' posts or uploaded images, etc.

Thus, in one example, if the number of the user $U_K$'s (or $U_4$'s) visits to the user $U_4$ (or $U_K$) exceeds a reference value, the cross-relationship analyzing module 130 may determine that the degree of closeness between the users $U_K$ and $U_4$ meets the predetermined criterion, thus generating a cross-relationship value of "Y" for the relationship between the $U_K$ and $U_4$.

In other example, if the number of the user $U_K$'s (or $U_4$'s) views or comments to the user $U_4$ (or $U_K$)'s posts or uploaded images exceeds a reference value, the cross-relationship analyzing module 130 may determine that the degree of closeness between the users $U_K$ and $U_4$ meets the predetermined criterion, thus generating a cross-relationship value of "Y" for the relationship between the $U_K$ and $U_4$.

Figure 2:
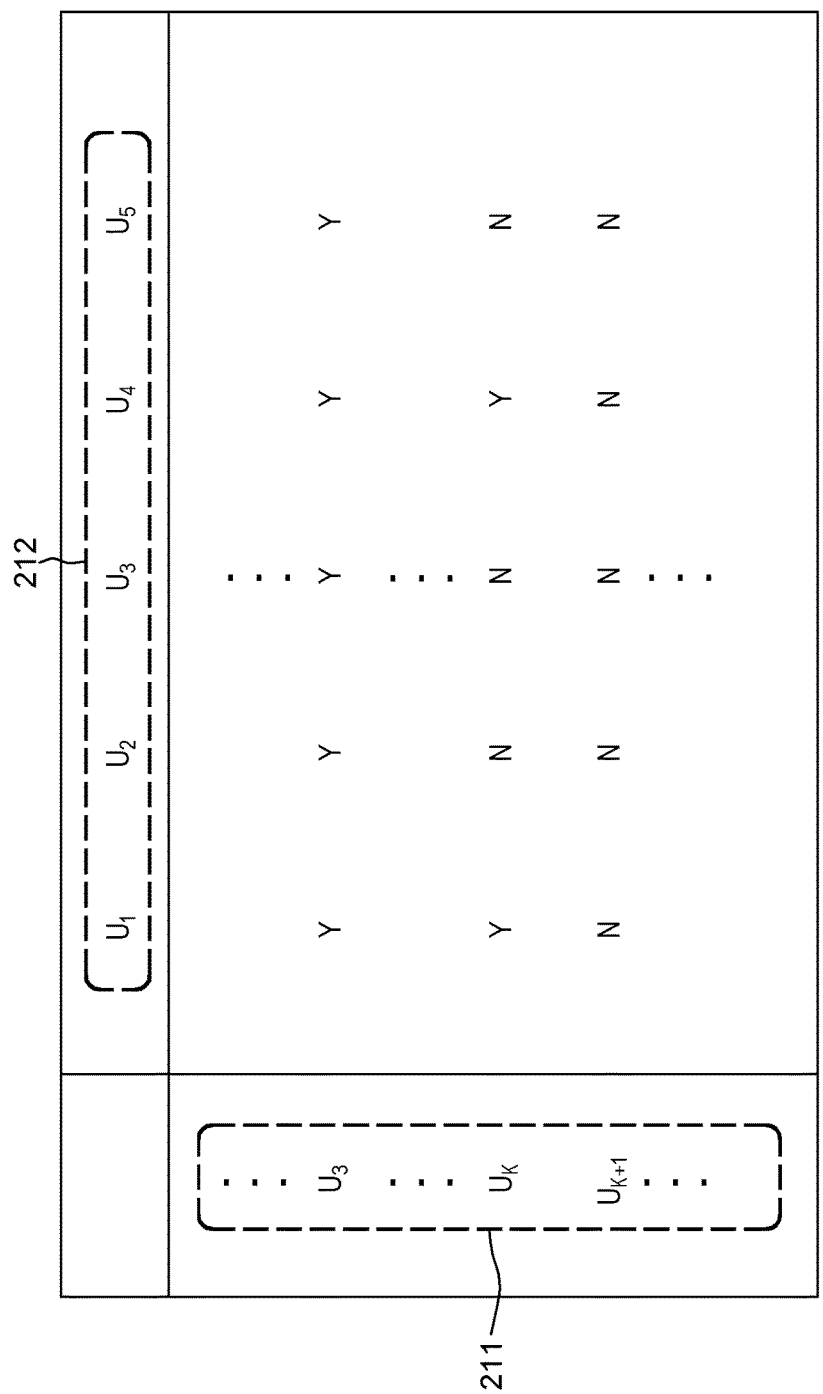
FIG. 2 is an example diagram illustrating cross-relationships among associated users according to an exemplary embodiment of the present disclosure.

FIG. 2 is an example diagram illustrating cross-relationships among associated users according to an exemplary embodiment of the present disclosure. Referring to the example of FIG. 2, cross-relationship values among users are shown as either "Y" or "N". Users (e.g., $U_3$, $U_K$, $U_{K+1}$) in the first column 211 represent the ones who want to access (e.g., download or see) the photo 30. Users (e.g., $U_1$ to $U_5$) in the first row 212 represent the ones within the photo 30. In FIG. 2, the existence of the user $U_3$ in the first column indicates a case where the user $U_3$ wants to access a photo that he/she took together with other users $U_1$, $U_2$, $U_4$, and $U_5$. The cross-relationship values may be stored in a memory (e.g., 160 of FIG. 1B).

Referring to the example of FIG. 2, if a degree of closeness between users meets the predetermined criterion, the cross-relationship analyzing module 130 may generate the cross-relationship value "Y" for the relationship between the users; otherwise, the cross-relationship analyzing module 130 may generate the cross-relationship value "N" for the relationship between the users.

In the example depicted in FIG. 2, it is understood that cross-relationship values between the user $U_K$ and other users $U_1$ to $U_5$ are "Y", "N", "N", "Y", and "N", respectively. For example, the user $U_K$ and each of the users $U_1$ and $U_4$ may be close enough (e.g., friends, family, colleagues, etc.) to share a photo or allow to see their faces each other in the photo, but the user $U_K$ and each of the users $U_2$, $U_3$, and $U_5$ might not be close enough to share a photo or allow to see their faces each other in the photo.

Referring back to FIG. 1B, the image recovering module 140 may remove blurring from faces of users or leave the blurring in a photo based on the cross-relationship values determined by the cross-relationship analyzing module 130. For example, responsive to a request for accessing the photo 30 from the user $U_K$, the image recovering module 140 may remove blurring from faces of the users $U_1$ and $U_4$ and leave blurring of faces of the other users $U_2$, $U_3$, and $U_5$, so that when the photo 30 (FIG. 4C) processed by the image recovering module 140 is displayed via the client device $20\_K$, the user $U_K$ can see the faces of the user $U_1$ and $U_4$ in the photo 30, but cannot see the faces of the users $U_2$, $U_3$, and $U_5$.

In one embodiment, one or more of the face detection module 110, the image blurring module 120, the cross-relation analyzing module 130, and the image recovering module 140 may be implemented using a hardware processor (e.g., 150 of FIG. 1B) or based on a field-programmable gate array (FPGA) design (not shown), but in other embodiments, they may be implemented based on program codes which are stored in a memory (e.g., 160 of FIG. 1B) or in the hardware processor, and executed by the hardware processor.

Although it is illustrated in FIG. 1B that the image recovering module 140 is implemented in the server 10, exemplary embodiments of the present disclosure are not limited thereto; for example, the image recovering module 140 may be implemented in a client device (e.g., 20$_{\_K}$ of FIG. 1A).

Figure 3:
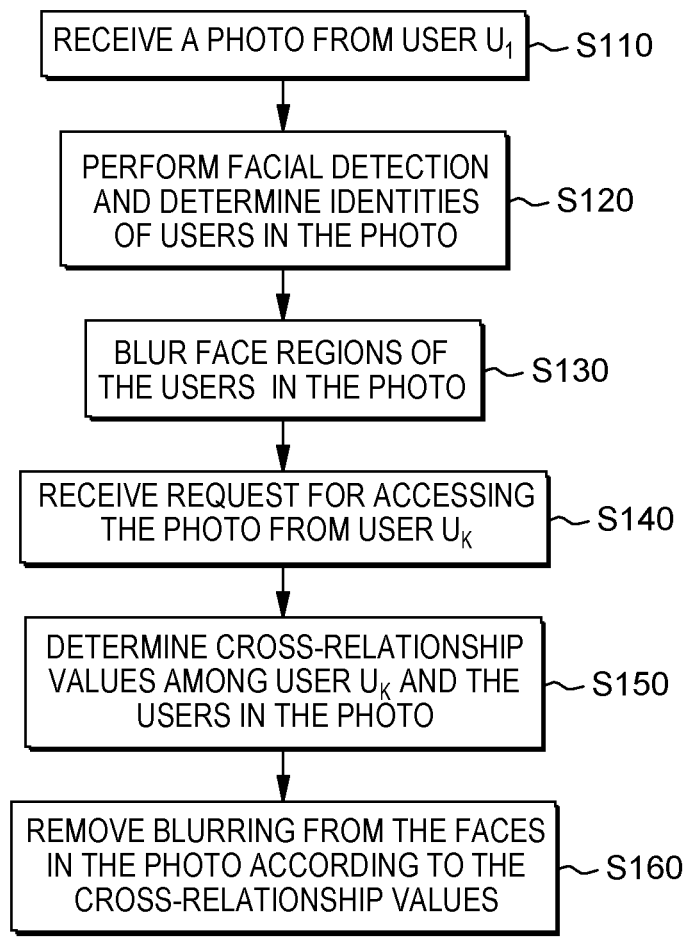
FIG. 3 is an example flow chart depicting a method for protecting personal privacy in a photo according to an exemplary embodiment of the present disclosure.

FIG. 3 is an example flow chart depicting a method for protecting personal privacy in a photo according to an exemplary embodiment of the present disclosure. FIG. 4A is an example original photo 30 before users' face are blurred, according to an exemplary embodiment of the present disclosure. FIG. 4B is an example photo 30 after the users' faces are blurred and before the blurring of faces is removed, according to an exemplary embodiment of the present disclosure. FIG. 4C is an example photo 30 after the blurring of faces are selectively removed, according to an exemplary embodiment of the present disclosure.

Referring to FIGS. 1A, 1B, and 3, the method is commenced with step S110 where the server 10 receives the photo 30 which has been uploaded from the user $U_1$. As depicted in the example of FIG. 4A, the photo 30 includes faces of the users $U_1$ to $U_5$. In this example, although it is assumed that one (e.g., the user $U_1$) of the $U_1$ to $U_5$ in the photo 30 uploads the photo 30, exemplary embodiments of the present disclosure are not limited thereto; for example, any other users other than the users $U_1$ to $U_5$ may upload the photo 30.

Next, referring back to FIG. 3, in step S120, the server 10 may perform a face detection on one or more users $U_1$ to $U_5$ in the photo 30 to detect faces of the $U_1$ to $U_5$ out of the photo 30 and determine identities of the users $U_1$ to $U_5$.

In step S130, the server 10 may perform blurring on the faces of the users $U_1$ to $U_5$ in the photo 30. FIG. 4B depicts the example photo 30 in which the users' faces are blurred. In one embodiment, the server 10 may selectively blur only the face regions of the users $U_1$ to $U_5$, leaving the other regions thereof.

In step S140, the server 10 may receive a request for accessing the photo 30 by a user (e.g., $U_K$ of FIG. 1A). In one example, the user $U_K$ may employ the client device 20$_{\_K}$ to send a request to the server 10 for accessing the uploaded photo 30.

In step S150, the server 10 may determine cross-relationship values among users based on various data or information related to relationships among the users. The various data or information related to relationships among the users may include, but are not limited: users' electronic address books, preset degrees of closeness between users, users' social media histories, third-party platforms which contain relationship information among users, etc.

In step S160, the server 10 may recover faces which have been blurred. To this end, the server 10 may selectively remove the blurring of faces in the photo 30. In one example, if the user $U_K$ is a person requesting access to the photo 30 and the cross-relationship values between the user $U_K$ and the users $U_1$ to $U_5$ are "Y", "N", "N", "Y", and "N", respectively, as depicted in FIG. 2, the blurring of the faces of the users $U_1$ and $U_4$ may be removed, leaving the blurring of the faces of other users $U_2$, $U_3$, and $U_5$, thus providing the photo 30 as depicted in the example of FIG. 4C. In this example, the users $U_K$ and $U_1$ and/or the users $U_K$ and $U_4$ are in a close relationship such as friends, family, colleagues, etc.

In one embodiment, the server 10 may transfer the blurred photo 30 to the client device 20$_{\_K}$ via the network 50 (or the client device 20$_{\_K}$ downloads the photo 30) and the client device 20$_{\_K}$ may perform the above-mentioned operations of the step S160.

Next, the photo 30 (FIG. 4C) may be provided to the client device 20$_{\_K}$ of the user $U_K$ and displayed via a display (not shown) of the client device 20$_{\_K}$. Thus, the user $U_K$ can see the faces of the user $U_1$ and $U_4$ in the photo 30 and cannot see the faces of the users $U_2$, $U_3$, and $U_5$ in the photo 30 due to the blurred regions made thereon.

In another example, referring to FIG. 2, if a person requested for accessing the photo 30 is the user $U_{K,i}$, the cross-relationship values between the user $U_{K+1}$ and the users $U_1$ to $U_5$ are all "N" (e.g., not in a close relationship). Thus, the server 10 may remove none of the blurred face regions, so that the user $U_{K+1}$ can see none of the faces of the users $U_1$ to $U_5$.

In still another example, if a person requested for accessing the photo 30 is the user $U_3$ which is among the users $U_1$ to $U_5$, the cross-relationship values between the user $U_3$ and the users $U_1$ to $U_5$ are all "Y". Thus, the server 10 may remove all of the blurred face regions of the photo 30, so that the user $U_3$ can see all of the faces of the users $U_1$ to $U_5$.

Figure 5:
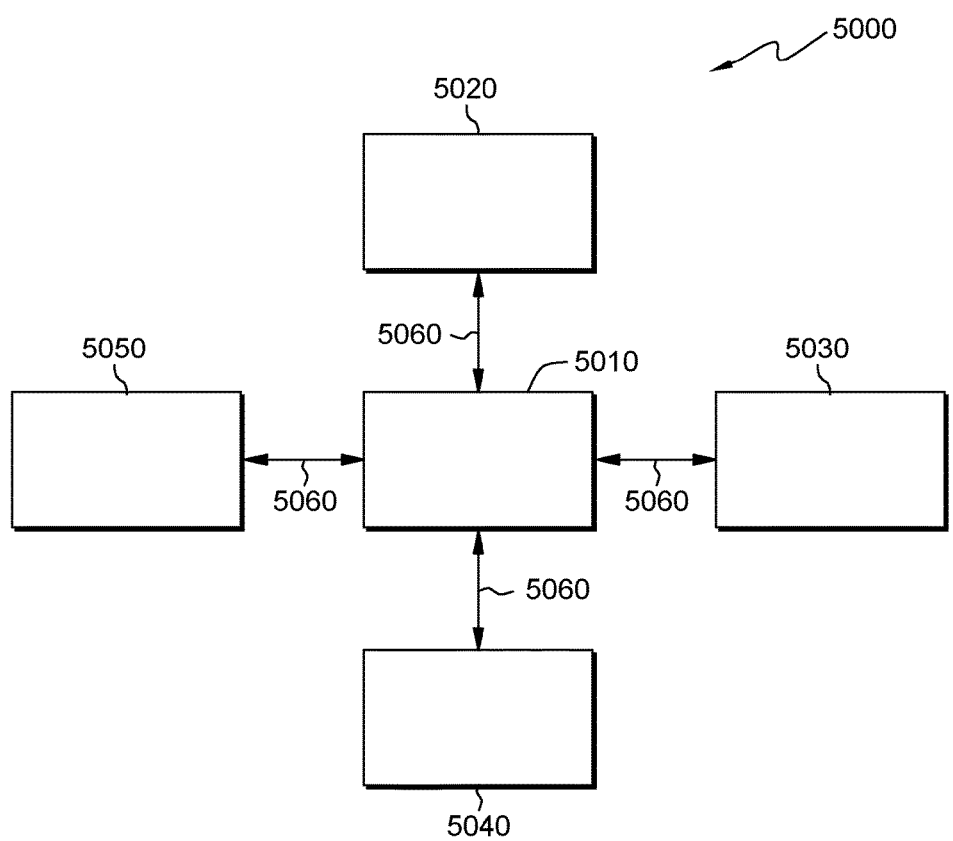
FIG. 5 is a block diagram of a computing system according to an exemplary embodiment of the present disclosure.

FIG. 5 is a block diagram of a computing system 5000 according to an exemplary embodiment of the present disclosure.

Referring to the example depicted in FIG. 5, the computing system 5000 may be used (without limitation) as a platform for performing (or controlling) the functions or operations described hereinabove with respect to the server 10 of FIG. 1B, and/or method of FIG. 3.

In addition (without limitation), the computing system 5000 may be implemented with an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 5, the computing system 5000 may include a processor 5010, I/O devices 5020, a memory system 5030, a display device 5040, bus 5060, and a network adaptor 5050.

The processor 5010 is operably coupled to and may communicate with and/or drive the I/O devices 5020, memory system 5030, display device 5040, and network adaptor 5050 through the bus 5060.

The computing system 5000 can communicate with one or more external devices using network adapter 5050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 5000 may also include or access a variety of computing system readable media. Such media may be any available media that is accessible (locally or remotely) by a computing system (e.g., the computing system 5000), and it may include both volatile and non-volatile media, removable and non-removable media.

The memory system 5030 can include computer system readable media in the form of volatile memory, such as random-access memory (RAM) and/or cache memory or others. The computing system 5000 may further include other removable/non-removable, volatile/non-volatile computer system storage media.

The memory system 5030 may include a program module (not shown) for performing (or controlling) the functions or operations described hereinabove with respect to the server 10 of FIG. 1B, and/or method of FIG. 3 according to exemplary embodiments. For example, the program module may include routines, programs, objects, components, logic, data structures, or the like, for performing particular tasks or implement particular abstract data types. The processor (e.g., 5010) of the computing system 5000 may execute instructions written in the program module to perform (or control) the functions or operations described hereinabove with respect to the server 10 of FIG. 1B, and/or method of FIG. 3. The program module may be programmed into the integrated circuits of the processor (e.g., 5010). In some embodiments, the program module may be distributed among memory system 5030 and one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A computer-implemented method for protecting personal privacy of one or more persons in a photo, comprising:
   receiving, at a hardware processor, digital image data of a digital photo including a face of at least one person;
   performing, by the hardware processor, based on said digital image data, a face recognition on the at least one person in the digital photo to thereby recognize the at least one person;
   determining, at the hardware processor, a cross-relationship value between another person requesting access to the digital photo and the at least one person recognized, based on a degree of closeness between said another person and the at least one person, wherein a first cross-relationship value indicates a degree of closeness between said another person and the at least one person recognized meeting a predetermined criterion and a second cross-relationship value indicates a closeness relationship between said another person and the at least one person recognized not meeting a predetermined criterion;
   modifying, using said hardware processor, said digital image data responsive to performing the face recognition on the at least one person in the photo, to blur the face of the at least one person in the digital photo;
   outputting, using said hardware processor, said digital photo to a display device associated with said another person for viewing of said digital photo; and
   determining, at the hardware processor, whether or not to show said another person the face of the at least one person recognized in the digital photo, based on the cross-relationship value,
   said digital image data being modified so that said blur of the face of said at least one person in the output digital photo is removed when accessed at the associated display device in response to determining the first cross-relationship value, or so that said blur of the face of said at least one person in the digital photo is not removed when accessed at the associated display device in response to determining the second cross-relationship value, wherein a degree of closeness represents one or more of:
   a first number indicating an amount of the another person's visits to a web site associated with the at least one person recognized;
   a second number indicating an amount of the another person's views or comments to posts or images uploaded by the at least one person recognized,
   wherein a predetermined criterion for determining a first cross-relationship value or second cross-relationship value is a threshold number of said visits, views or comments against which a corresponding the first number and or the second number is measured.

2. The method of claim 1, further comprising:
   removing the blurring from the face, responsive to a determination of showing said another person the face of the at last one person in the photo.

3. The method of claim 1, wherein the degree of closeness is determined using at least one of:
   one or more address books associated with said another person; and
   one or more social network contexts between said another person and the at least one person.

4. The method of claim 1, wherein the predetermined criterion is determined to be met, responsive to determining that said another person and the at least one person are friends, family, or colleagues to each other.

5. The method of claim 1, further comprising:
   changing the cross-relationship value between said another person and the at least one person, responsive to receiving a change request for the cross-relationship value.

6. The method of claim 1, wherein the cross-relationship between said another person and the at least one person recognized is determined as the first value, responsive to determining that the digital photo further includes an image of said another person.

7. A system for protecting personal privacy of one or more persons in a photo, comprising:
   a memory device;
   a processing device coupled to the memory device, the processing device is configured to perform:
   receiving digital image data of a digital photo including a face of at least one person;

performing, based on said digital image data, a face recognition on the at least one person in the digital photo to thereby recognize the at least one person;

determining a cross-relationship value between another person requesting access to the digital photo and the at least one person recognized, based on a degree of closeness between said another person and the at least one person, wherein a first cross-relationship value indicates a degree of closeness between said another person and the at least one person recognized meeting a predetermined criterion and a second cross-relationship value indicates a closeness relationship between said another person and the at least one person recognized not meeting a predetermined criterion;

modifying said digital image data, responsive to performing the face recognition on the at least one person in the photo to blur the face of the at least one person in the digital photo;

outputting said digital photo to a display device associated with said another person for viewing of said digital photo; and determining whether or not to show said another person the face of the at least one person in the digital photo, based on the cross-relationship value, said digital image data being modified so that said blur of the face of said at least one person in the output digital photo is removed when accessed at the associated display device in response to determining the first cross-relationship value, or so that said blur of the face of said at least one person in the digital photo is not removed when accessed at the associated display device in response to determining the second cross-relationship value, wherein a degree of closeness represents one or more of:

a first number indicating an amount of the another person's visits to a web site associated with the at least one person recognized;

a second number indicating an amount of the another person's views or comments to posts or images uploaded by the at least one person recognized, wherein a predetermined criterion for determining a first cross-relationship value or second cross-relationship value is a threshold number of said visits, views or comments against which a corresponding the first number and or the second number is measured.

8. The system of claim 7, wherein the processing device is further configured to perform:

removing the blurring from the face, responsive to a determination of showing said another person the face of the at last one person in the photo.

9. The system of claim 7, wherein the degree of closeness is determined using at least one of:

one or more address books associated with said another person; and one or more social network contexts between said another person and the at least one person.

10. The system of claim 7, wherein the predetermined criterion is determined to be met, responsive to determining that said another person and the at least one person are friends, family, or colleagues to each other.

11. The system of claim 7, wherein the processing device is further configured to perform:

changing the cross-relationship value between said another person and the at least one person, responsive to receiving a change request for the cross-relationship value.

12. The system of claim 7, wherein the cross-relationship between said another person and the at least one person is determined as the first value, responsive to determining that the digital photo further includes an image of said other person.

13. A computer program product comprising a computer-readable storage medium having computer readable program instructions embodied therewith, the computer readable program instructions executable by at least one processor to cause a computer to perform a computer-implemented method for protecting personal privacy of one or more persons in a photo, the method comprising:

receiving digital image data of a digital photo including a face of at least one person;

performing, based on said digital image data, a face recognition on the at least one person in the digital photo to thereby recognize the at least one person;

determining a cross-relationship value between another person requesting access to the digital photo and the at least one person recognized, based on a degree of closeness between said another person and the at least one person, wherein a first cross-relationship value indicates a degree of closeness between said another person and the at least one person recognized meeting a predetermined criterion and a second cross-relationship value indicates a closeness relationship between said another person and the at least one person recognized not meeting a predetermined criterion;

modifying said digital image data, responsive to performing the face recognition on the at least one person in the photo to blur the face of the at least one person in the digital photo;

outputting said digital photo to a display device associated with said another person for viewing of said digital photo; and determining whether or not to show said another person the face of the at least one person in the digital photo, based on the cross-relationship value, said digital image data being modified so that said blur of the face of said at least one person in the output digital photo is removed when accessed at the associated display device in response to determining the first cross-relationship value, or so that said blur of the face of said at least one person in the digital photo is not removed when accessed at the associated display device in response to determining the second cross-relationship value, wherein a degree of closeness represents one or more of:

a first number indicating an amount of the another person's visits to a web site associated with the at least one person recognized;

a second number indicating an amount of the another person's views or comments to posts or images uploaded by the at least one person recognized, wherein a predetermined criterion for determining a first cross-relationship value or second cross-relationship value is a threshold number of said visits, views or comments against which a corresponding the first number and or the second number is measured.

14. The computer program product of claim 13, further comprising:

removing the blurring from the face, responsive to a determination of showing said another person the face of the at last one person in the photo.

15. The computer program product of claim 13, wherein the degree of closeness is determined using at least one of:

one or more address books associated with said another person; and one or more social network contexts between said another person and the at least one person.

16. The computer program product of claim 13, further comprising:

changing the cross-relationship value between said another person and the at least one person, responsive to receiving a change request for the cross-relationship value.

17. The computer program product of claim 13, wherein the cross-relationship between said another person and the at least one person is determined as a first value, responsive to determining that the digital photo further includes an image of said another person.

* * * * *